United States Patent [19]
Coleman

[11] Patent Number: 6,024,559
[45] Date of Patent: Feb. 15, 2000

[54] MOLD FOR MAKING PLASTIC FISHING LURES

[75] Inventor: Regina M. Coleman, Pinson, Ala.

[73] Assignee: Zorn Molds, Pinson, Ala.

[21] Appl. No.: 08/985,727

[22] Filed: Dec. 4, 1997

Related U.S. Application Data

[63] Continuation of application No. 08/676,891, Jul. 8, 1996, abandoned, which is a continuation of application No. 08/286,425, Aug. 5, 1994, abandoned.

[51] Int. Cl.[7] .................................................. B29C 45/68
[52] U.S. Cl. ........................ 425/572; 249/170; 425/409; 425/588
[58] Field of Search .................................... 425/572, 808, 425/812, 588, 409, 130; 249/118, 119, 137, 170; 43/17.6

[56] References Cited

U.S. PATENT DOCUMENTS

| | | | |
|---|---|---|---|
| 2,330,369 | 9/1943 | Marsh ...................................... | 425/572 |
| 3,971,841 | 7/1976 | Rubinstein .............................. | 425/808 |
| 4,437,257 | 3/1984 | Kluge ...................................... | 425/812 |
| 5,494,432 | 2/1996 | Coggins et al. ......................... | 425/812 |

Primary Examiner—Tim Heitbrink
Attorney, Agent, or Firm—Robert J. Veal; Kenneth M. Bush; Veal & Bush, LLC

[57] ABSTRACT

A cavity block and method for manufacturing such a block utilizes a computer assisted machining tool to form a composite cavity in a plurality of cavity block segments such that the segments can be separated after the machining of the cavity and paired in horizontal abutment rather than vertical abutment to reorient the lure or article about a new axis after the cavity has been created.

3 Claims, 5 Drawing Sheets

MOLD FOR MAKING PLASTIC FISHING LURES

This application is a continuation of application Ser. No. 08/676,891 filed Jul. 8, 1996 now abandoned which is a continuation of Ser. No. 08/286,425 filed Aug. 5, 1994 now abandoned.

FIELD OF THE INVENTION

The present invention relates to molds such as are used in the manufacture of fishing lures and similar small plastic articles which may require intricate shapes. In even greater particularity, the present invention relates to the manufacture of mold components which enable the molder to cast shapes which are not obtainable using sand casting techniques. In still greater particularity, the present invention relates to the manufacture of a mold component wherein the mold cavity is formed on a plurality of separate units and joined together to create a casting cavity.

BACKGROUND OF THE INVENTION

Soft plastic articles, such as fishing lures, are well known and injection molding of such lures is widely practiced.

Typically, injection molding is accomplished using a mold which has a stationary half and a movable half, each of which carry plurality of matched cavity blocks. Each cavity block has defined therein a chamber which can be filled with plastic and when mated with the matching chamber of the matching cavity block casts a complete article. The plastic is injected into the chambers through a central conduit or gate which feeds several cavity blocks mounted on the mold.

Techniques and uses of such molds in the fishing lure industry allow a wide variety of lures to be cast currently, including artificial worms, lizards, minnows and other insects. Typically, the molds are created by first creating a model of the lure to be cast, such as a wooden model which has been hand carved and using this model to form the cavity in the mold by casting the cavity blocks about the model or a duplicate thereof. The model is retrieved after the mold is cast and hardened. It will be appreciated that the model surfaces must thus be formed such that the model can be removed from the casting intact for use in subsequent castings; accordingly, the model must be oriented in the mold such that no portion of the model is obscured from the parting line of the cavity blocks. Thus, articles which have a downturned tail or other terminal portion which might extend obliquely of the parting line are cast in profile such that the sides of the lure are defined in the cavity block. In this manner, the two sides of a creature may be brought together in the matching cavity blocks and the creature, e. g., a minnow, is made from plastic with its vertical or dorsal plane in alignment with the parting line of the cavity blocks. On a lure with a symmetrical body, this does not present a problem; however, on a lure which is only bilaterally symmetrical, problems can occur when it is desired to form the lure from two plastics having different coloration, wherein the lure is desired with a top color and a bottom color, such as a minnow with a green back and a yellow stomach. If the minnow shape requires profile manufacture of the mold cavity as noted herein above then the manufacturer cannot inject the two colors of plastic to achieve the desired lamination. Consequently, lure manufactures have had to paint or otherwise color the lures after molding to achieve the desired laminated appearance in such lures.

SUMMARY OF THE INVENTION

The principal object of the invention is to provide a means for molding plastic articles which allows the mold cavity which defines the article to be cast to be rotated about its longitudinal axis, thereby facilitating the injection of plastic in a laminar manner to achieve a multi-color lure of a desired shape. It is the resultant object of this invention to reduce the cost of manufacturing such articles by eliminating the necessity of painting such articles after they have been formed to achieve a multi-color appearance.

It is a further object of the invention to permit the injection molding of articles in colors which were not heretofore possible due to the shape and combination of colors desired.

These and further objects of the invention are accomplished in the novel use of computer-aided machining of the mold cavities. However, merely machining the mold cavities is insufficient inasmuch as the machining tool cannot define all surfaces satisfactorily due to the angles of the surfaces. Thus, it is necessary to fashion the cavity blocks in which the present invention is embodied from multiple elements each containing a portion of the cavity and to arrange a plurality of these elements on the mold portions to define the movable and stationary cavity blocks.

The present invention utilizes computer controlled machining equipment to form a profile of a lure in a pair of abutting elements of the cavity blocks; however, one of the elements so machined will be used in the movable portion of the mold and the other in the stationary. Thus, the profile is rotated 90 degrees about the longitudinal axis such that the vertical plane of the article to be cast is perpendicular to the parting line of the mold. This allows horizontal laminations of the colored plastic to be injected into cavity.

BRIEF DESCRIPTION OF THE DRAWINGS

A mold system incorporating features of the invention is depicted in the accompanying drawings which form a portion of this disclosure and wherein.

DESCRIPTION OF A PREFERRED EMBODIMENT

Figure 1:
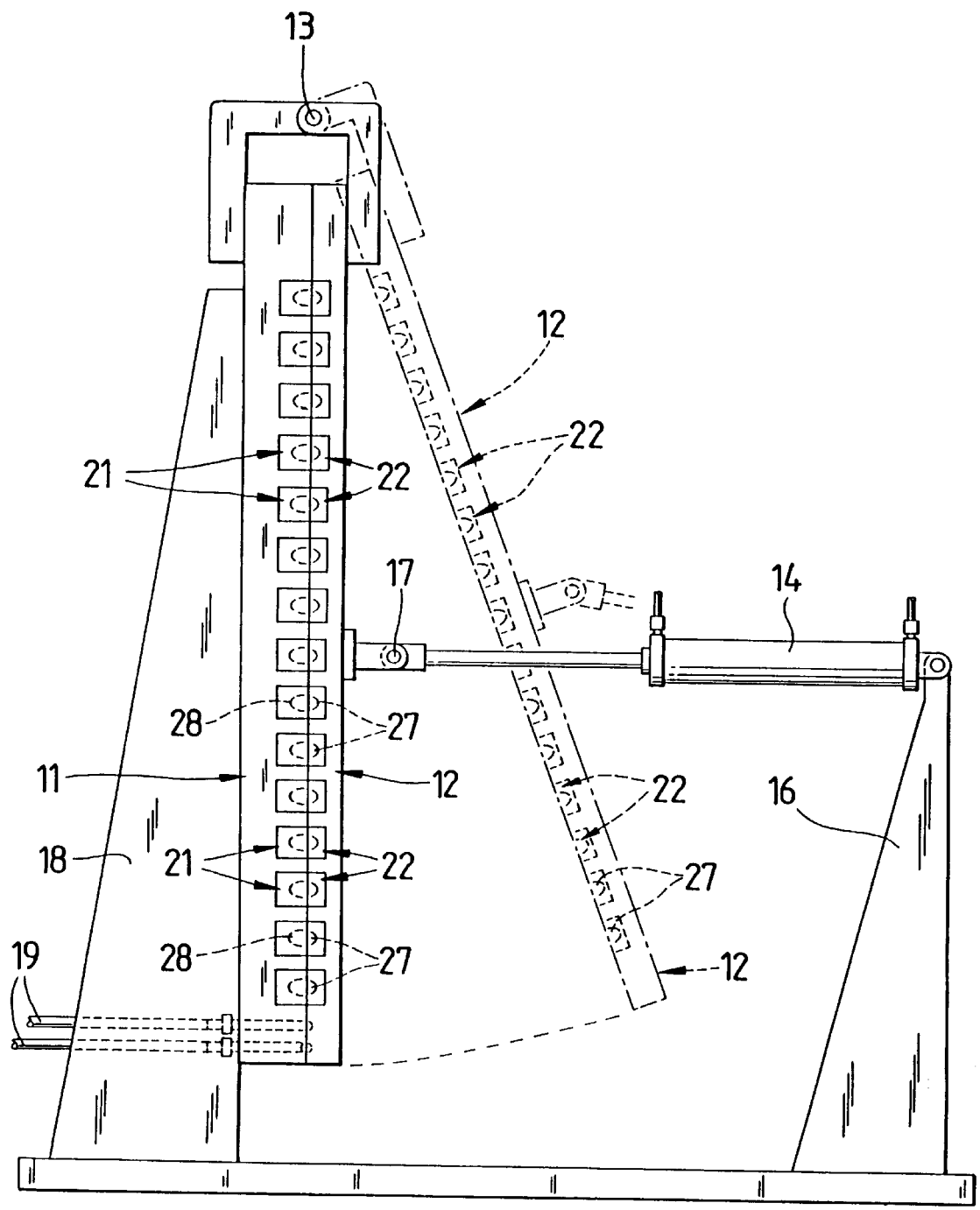
FIG. 1 is a side elevational view of a mold of the type in which the present invention may be used.

Referring to the Figures for a clearer understanding of the invention, it may be seen in FIG. 1 that an embodiment of the invention may be used in an injection molding apparatus for fishing lures. The apparatus shown is a lure mold having a stationary side 11 and a movable side 12 connected by a hinge pin 13. The movable side 12 is selectively movable between a mold open position and a mold closed position under the influence of a linear actuator 14 mounted between a stanchion 16 and a hinge connection 17 to the movable side 12. The stationary side is supported on a fixed stanchion 18 and is provided with appropriate plumbing 19 to supply liquid plastic for injection. Additional plumbing (not shown) is provided in a known manner for water which may be circulated for cooling of the mold structure.

Figure 2:
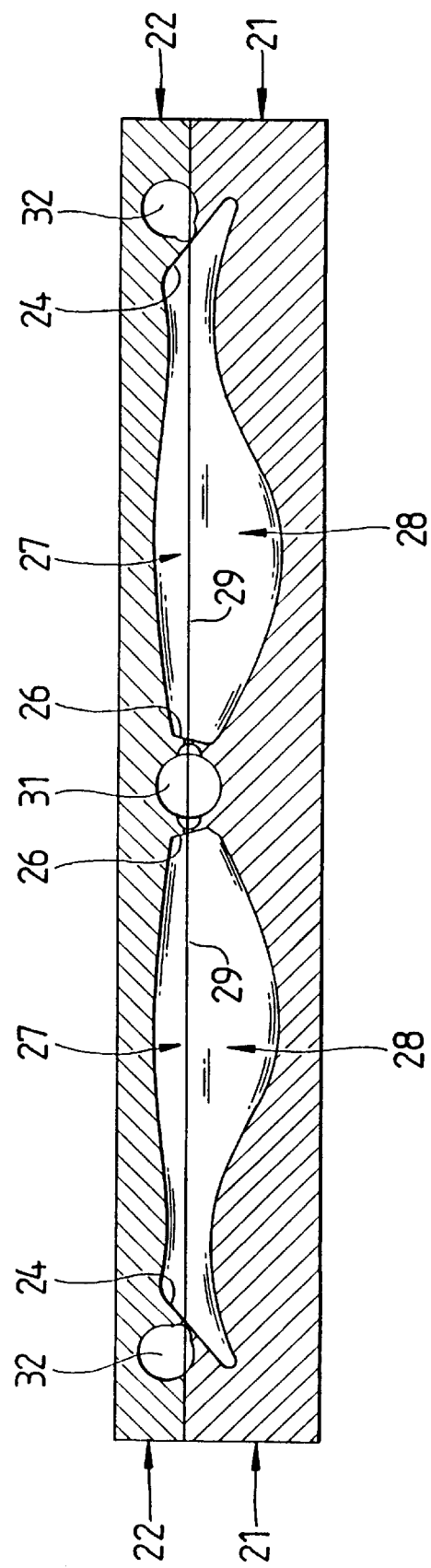
FIG. 2 is a plan view of adjacent cavity block elements as they are machined.

It will be appreciated that the structure thus described may be used to manufacture any molded article of appropriate size and the actual shape of the article will be dependent on the mold cavities. The mold cavities as defined by a plurality of cavity blocks will be mounted to the stationary and movable sides as shown at 21 and 22 respectively. An example of a design which necessitates the present invention is shown in FIG. 2. The lure is in the shape of a minnow having a tail which is downturned and has a sloping rear surface 24. The nose of the minnow body terminates in a downwardly and forwardly sloping surface 26. In FIG. 2 it may be seen that the lure shape is defined in two block segments 27 and 28. The upper segment 27 abuts the lower segment 28 at plane 29 forming a contiguous joint. These segments are secured in this position at a fixed reference location relative to a computer controlled machining tool which are well known in the art. Such tools are programmed to machine a particular pattern in a material and will repeat the pattern as often as commanded to do so. In the present invention segments 27 and 28 are affixed to the surface of the tools such that the preprogrammed pattern is machined partially in each segment. Further in this invention, the pattern forms a cavity in the segments at a first location and a second cavity in the segments at a fixed position relative to the first cavity such that the cavities are complementary to each other. That is to say, the tool machines cavities in the segments which if placed in abutting relationship ship would define a complete shape within the cavity block. By so doing the tool has created two profiles of the lure in the cavity block segments with the sloping terminal surfaces of the lure extending obliquely to the plane 29. As many duplicates of these segments may be made as are necessary to the commercial practice of the invention.

It should be appreciated that the segments as machined now form a top and bottom of the profile. Accordingly when a second pair of segments have been machined identically to the first set, the two bottom segments 28 can be placed in abutting relationship with the cavities facing each other to define the bottom of the lure within the composite cavity.

Figure 3:
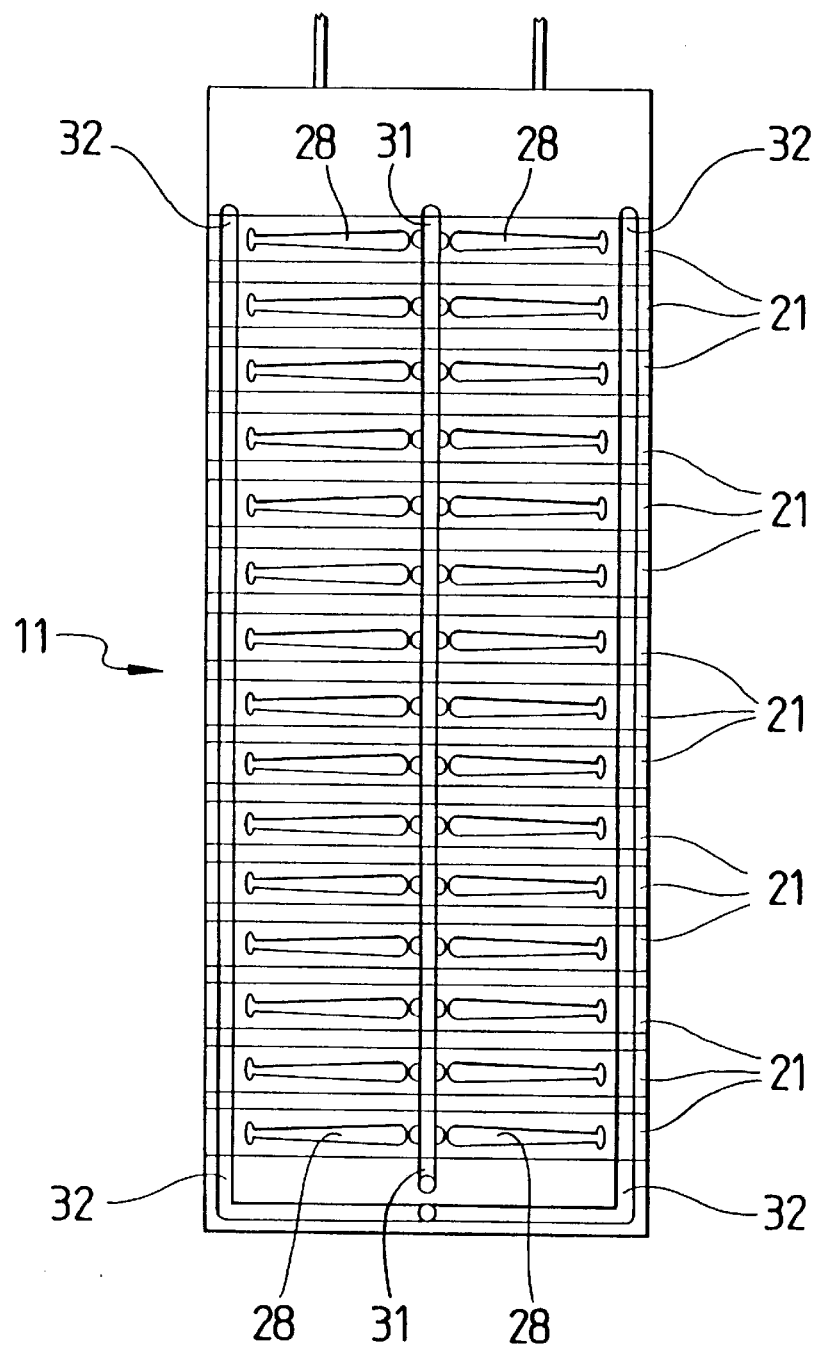
FIG. 3 is a plan view of the stationary half of the mold with the cavity blocks attached.
Figure 4:
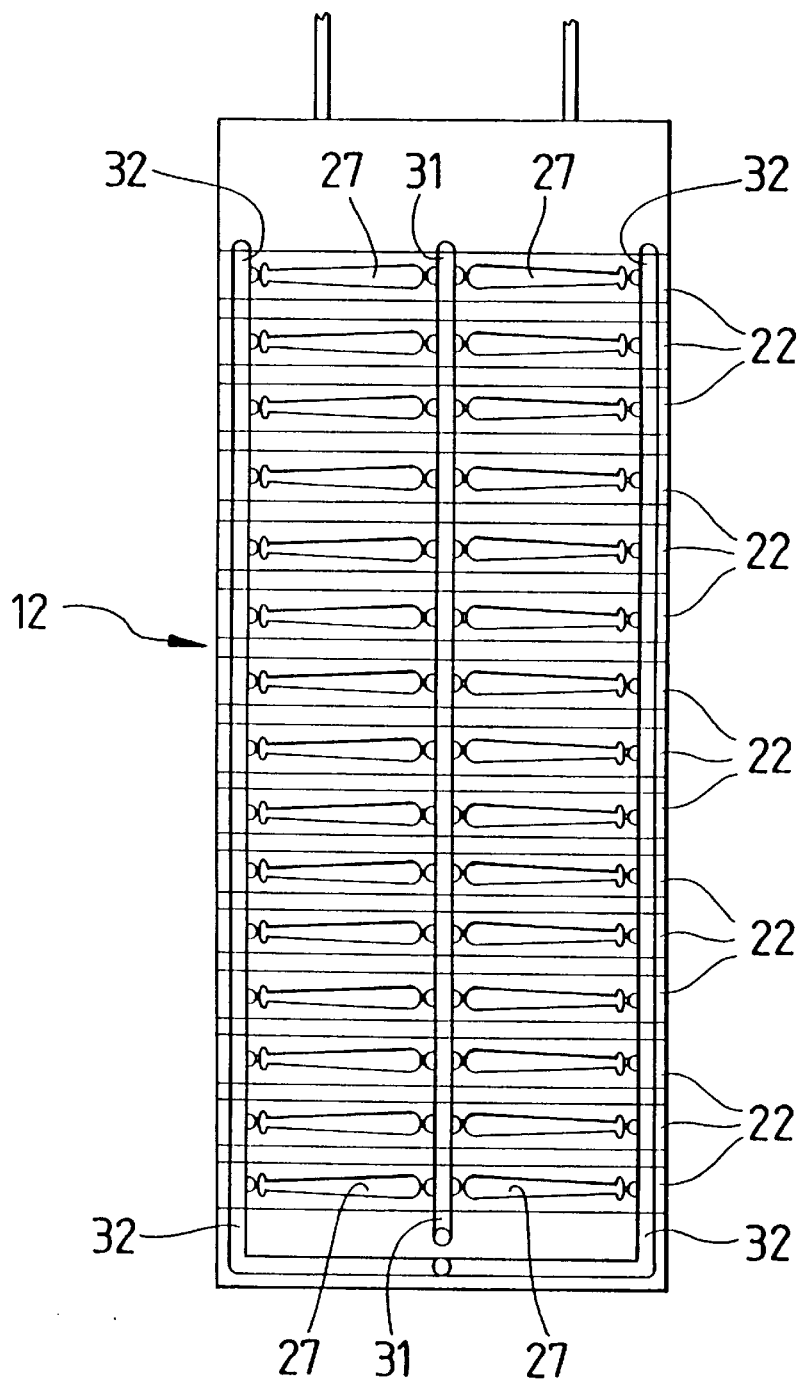
FIG. 4 is a plan view of the movable half of the mold with the cavity blocks attached.
Figure 5:
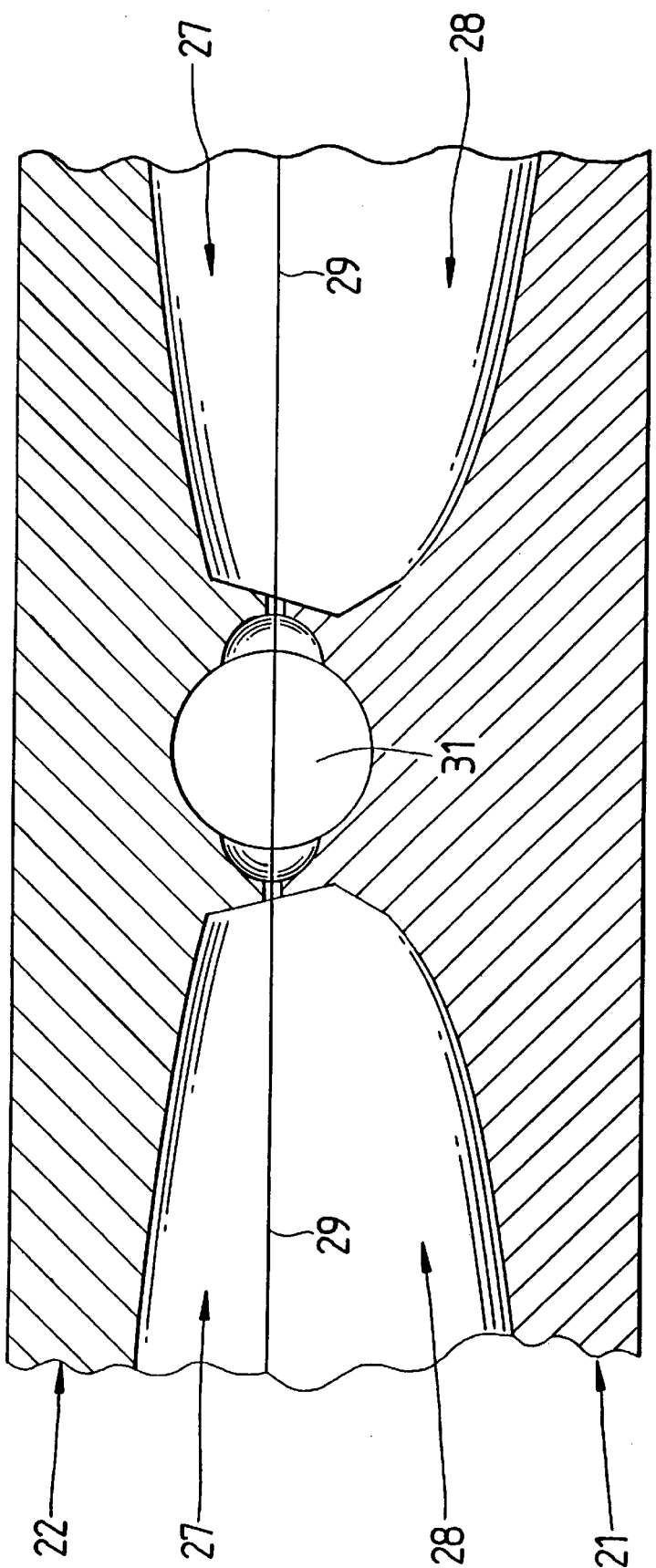
FIG. 5 is a partial sectional view taken transversely of the central plastic injection gate.

Referring to FIGS. 1 and 3 it can be seen that a plurality of such segments 28 are affixed in paired abutting relationship to define an array of cavity blocks 21 in the stationary side of the mold. In this manner, a plurality of bottom cavities may be formed with each bottom cavity communicating with a plastic gate 31 formed along the centerline of the mold. Likewise, as shown in FIGS. 1 and 4 a plurality of top segments 27 are mounted to moving side 12 to form a complementary array of cavity blocks 22 which define the top cavities to match the bottom cavities. The top cavities are connected to the centerline gate 31 and to a peripheral gate 32 such that plastic may also be injected to the cavities at the tail of the lure. Note that in this configuration the vertical axis of the lure (the dorsal axis for a minnow) is perpendicular to the plane 29 which becomes the parting line of the mold. It is noteworthy to mention that had one attempted to cast a mold of the illustrated minnow configuration the mold pattern about which the cavity blocks would have been cast could not have been retrieved from the cavity, with the tail and nose being obscured from the parting line by the overlying portion of the cavity block. The importance of orienting the vertical axis 5 of the lure perpendicular to the parting line is illustrated in FIG. 2. When it is desirable to produce a lure of two different colors along its length, the plastics are injected simultaneously through gate 31 such that a horizontal laminar effect is achieved, the one color plastic flowing in the upper lamination and the other below. As the flow reaches each cavity block, the upper and lower laminations both enter the cavity and retain their laminar nature creating a lure with a horizontally aligned color lamination. If the lures vertical axis were parroters to the parting plane, the lamination of the lure would result in a vertical lamination such that the right hand side of the lure would be one color and the left hand side the other. If the plastic is injected in vertical laminations, then one color fills the cavities on one side of the mold while the other color fills the cavities on the other side. Thus, to achieve the desired lure coloration, the lure body must be properly oriented to receive both colors of plastic in horizontal strata. Also note that by injecting a third color plastic though peripheral gate 32, a three color lure such as a minnow with a tail colored differently from the body can be produced.

It should also be noted that the cavities are defined by composite chambers formed within the cavity blocks by the machined surfaces, including at least one surface which extends obliquely to the parting line and is thereby obscured 5 by the cavity block. In the practice of the present invention such a surface does not create a problem since it is machined before it is joined in the composite cavity block; however, such a surface would be difficult or impossible to machine directly into the surface parallel to the parting line.

What I claim is:

1. In a mold for making soft plastic lures, wherein the mold includes a stationary portion and a movable portion, the improvement comprising:
    (a) a cavity block detachably affixed to said stationary portion and adapted to receive said plastic therein for forming said lures, said cavity block having defined therein a machined chamber in the shape of a portion of said lure; and
    (b) a cooperative cavity block detachably affixed to said movable portion and adapted to receive plastic therein for forming said lure, said cooperative cavity block having defined therein a chamber in the shape of a cooperative portion of said lure, wherein said cavity block and said cooperative cavity block are positioned such that said chambers are in cooperative abutment along a parting plane defined by the plane of abutment on which said movable portion urges said cooperative cavity block into abutting relationship with said cavity block, with at least one of said chambers being partially defined by at least one surface oblique to said parting plane with said surface obscured from said parting plane by a portion of said cavity block, said cavity block and said cooperative cavity block each comprising a pair of cavity block segments having defined therein a portion of the respective chambers, said each pair of cavity block segments being joined along a plane transverse to said parting plane with each said portion of said chamber being totally unobscured from said transverse plane.

2. The mold as defined in claim 1 wherein said pair of cavity block segments of said cavity block and said cooperative cavity block define a left and right block segment, wherein the left segment of said cavity block and the left segment of said cooperative cavity have machined thereinto cooperative portions of said respective chambers to define a vertical profile of said lure including a portion of said oblique surface there being no surface obscured in from said transverse plane.

3. In a mold for forming a fishing lure having a longitudinal axis, a given dimension transverse to said longitudinal axis, a vertical dimension orthogonal to said longitudinal axis and said transverse dimension, the improvement comprising, a first and second composite cavity block, selectively movable relative to each other in confronting relationship along a parting plane therebetween said parting plane parallel to said longitudinal axis, each formed from a pair of cavity block segments defining a shape of a fishing lure with each cavity block segment in each composite cavity block having a mirror image of a portion of said lure shape machined therein, wherein at least one composite cavity block is formed with said shape having at least one surface which is obscured from said parting plane by a portion of said cavity block segments forming said cavity block.

* * * * *